United States Patent
Donderici et al.

(10) Patent No.: US 9,921,332 B2
(45) Date of Patent: Mar. 20, 2018

(54) CROSSTALK SUPPRESSION OR REMOVAL FOR GALVANIC MEASUREMENTS

(71) Applicant: Halliburton Energy Services, Inc., Houston, TX (US)

(72) Inventors: Burkay Donderici, Houston, TX (US); George David Goodman, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 19 days.

(21) Appl. No.: 14/892,332

(22) PCT Filed: Aug. 14, 2013

(86) PCT No.: PCT/US2013/054868
§ 371 (c)(1),
(2) Date: Nov. 19, 2015

(87) PCT Pub. No.: WO2015/023270
PCT Pub. Date: Feb. 19, 2015

(65) Prior Publication Data
US 2016/0091627 A1    Mar. 31, 2016

(51) Int. Cl.
*G01V 3/24* (2006.01)
*G01V 3/20* (2006.01)
*E21B 49/00* (2006.01)

(52) U.S. Cl.
CPC ............ *G01V 3/20* (2013.01); *E21B 49/00* (2013.01); *G01V 3/24* (2013.01)

(58) Field of Classification Search
CPC ... G01V 3/24; G01V 3/20; G01V 3/26; G01V 3/00; G01V 3/18; G01V 3/38; G01V 3/02;
(Continued)

(56) References Cited

U.S. PATENT DOCUMENTS 5,081,419 A    1/1992 Meador et al.
6,765,385 B2    7/2004 Sinclair et al.
(Continued)

FOREIGN PATENT DOCUMENTS

WO    WO-2012067599 A1    5/2012
WO    WO-02086459 A1    10/2012
WO    WO-2015023270 A1    2/2015

OTHER PUBLICATIONS

"International Application Serial No. PCT/US2013/054868, International Search Report dated May 15, 2014", 5 pgs.
(Continued)

*Primary Examiner* — Jermele M Hollington
*Assistant Examiner* — Taqi Nasir
(74) *Attorney, Agent, or Firm* — Gilliam IP PLLC

(57) ABSTRACT

Apparatus and techniques are described, such as for obtaining information indicative of a formation resistivity, such as using information from a galvanic measurement apparatus. A resistive parameter related to a geologic formation is estimated through use of a model. An electrical excitation is coupled from a well tool in a borehole to the geologic formation. Induced voltages resulting from the excitation are received using monitor electrodes selected according to the specified excitation mode, including receiving magnitude and phase information corresponding to the induced voltages. The resistive parameter of the model is then determined using the magnitude and phase information of the received voltages, and using magnitude and phase information about the excitation.

23 Claims, 7 Drawing Sheets

(58) Field of Classification Search
CPC ... G01V 3/30; G01V 3/34; G01V 3/36; G01V 5/045; G01V 5/06; G01V 5/08; G01V 9/02
USPC ....... 324/366, 355, 347, 354, 360, 364, 373, 324/367, 374
See application file for complete search history.

(56) References Cited

U.S. PATENT DOCUMENTS

| | | | |
|---|---|---|---|
| 6,777,940 | B2 | 8/2004 | Macune |
| 7,896,073 | B2 | 3/2011 | Forgang et al. |
| 8,050,865 | B2 | 11/2011 | Zhao et al. |
| 2002/0016678 | A1 | 2/2002 | Haugland |
| 2003/0105590 | A1* | 6/2003 | Mollison .................. G01V 3/28 702/7 |
| 2004/0000911 | A1 | 1/2004 | Morys |
| 2005/0046424 | A1 | 3/2005 | Sinclair et al. |
| 2008/0088313 | A1* | 4/2008 | Forgang .................. G01V 3/24 324/339 |
| 2008/0272789 | A1* | 11/2008 | San Martin ............. G01V 3/24 324/355 |
| 2010/0039115 | A1 | 2/2010 | Bespalov et al. |
| 2011/0112810 | A1* | 5/2011 | Scoullar .................. G01T 1/171 703/2 |
| 2011/0204897 | A1 | 8/2011 | Hu et al. |
| 2011/0309833 | A1 | 12/2011 | Yang |
| 2012/0119744 | A1* | 5/2012 | Habashy .................. G01V 3/24 324/339 |
| 2012/0234605 | A1* | 9/2012 | Donderici ................ G01V 1/46 175/73 |
| 2013/0069656 | A1* | 3/2013 | Haramboure ............ G01V 3/24 324/355 |
| 2013/0248247 | A1* | 9/2013 | Sugiura ................... E21B 47/12 175/24 |
| 2015/0177406 | A1 | 6/2015 | Li et al. |

OTHER PUBLICATIONS

"International Application Serial No. PCT/US2013/054868, Written Opinion dated May 15, 2014", 10 pgs.
"Australian Application Serial No. 2013397963, Office Action dated Apr. 29, 2016", 3 pgs.
"European Application Serial No. 13891586.3, Office Action dated Jan. 29, 2016", 2 pgs.
"European Application Serial No. 13891586.3, Response filed Jul. 28, 2016, to Office Action dated Jan. 29, 2016", 10 pgs.
"International Application Serial No. PCT/US2013/054868, International Preliminary Report on Patentability dated Feb. 25, 2016", 12 pgs.
GCC Application Serial No. 201427743, First Examination Report, dated Nov. 5, 2017, 6 pages.

* cited by examiner

CROSSTALK SUPPRESSION OR REMOVAL FOR GALVANIC MEASUREMENTS

CROSS-REFERENCE TO RELATED APPLICATION

This application is a U.S. National Stage Filing under 35 U.S.C. 371 from International Application No. PCT/US2013/054868, filed on 14 Aug. 2013, and published as WO 2015/023270 on 19 Feb. 2015, which application is incorporated herein by reference in its entirety.

BACKGROUND

Various techniques may be used to evaluate geological formations. For example, measurements may be made using tools located within a borehole such as in support of geophysical and petrophysical exploration or resource extraction. In one approach, an apparent resistivity (or conductivity) of a formation may be evaluated such as by injecting a current from a location within the borehole into a portion of the formation, and conductively measuring a resulting voltage induced by the current. Such resistivity information may provide a general indication of formation composition or geometry, including providing indicia of invasion or hydrocarbon presence.

Early examples of this type of borehole resistivity (i.e., "galvanic") measurement tools generally included a small number of electrodes and generally operated only in one or two measurement modes. Such early examples provided virtually no explicit control over a radial depth of resistivity investigation into a formation. Later examples included one or more "guard" electrodes configured to provide an equal potential (or "equipotential") region in the medium nearby the electrode array, thus forcing a larger proportion of the injected current into the formation. Such a configuration is generally referred to as a "laterolog" or "guard log" tool.

Further development of laterolog tools included providing an array of current and monitor electrodes, such as to provide resistivity logging for a variety of relatively shallower or relatively deeper radial depths of investigation. In an array laterolog, focusing of an injected current may be established using hardware or software techniques, or a combination of both hardware and software techniques.

Despite these advances, certain measurement scenarios may still be problematic for array laterolog measurements. For example, when a formation resistivity is much larger than a resistivity of mud located in the borehole, the measured voltage differences between some of the monitor electrodes may be very small, or even below a noise floor of the system. Such measurements may also be confounded by reactive (e.g., inductive or capacitive) effects, such as mutual magnetic coupling between an excitation circuit and a measurement circuit. Other sources of errors or non-linearities may also confound measurements, resulting in an erroneous determination of "apparent" formation resistivity.

In one approach, attempts to manage such errors have included mechanical and electrical solutions that attempt to reduce coupling between electrodes or attempt to reduce a system thermal noise. In other approaches, attempts have been made to reduce noise effects by averaging, reduction of tool dimensions, or by increasing the emitted current in order to increase the monitor electrode voltages. Another approach is presented herein.

DETAILED DESCRIPTION

Apparatus and techniques are described, such as for obtaining information indicative of a formation resistivity, such as using information from a galvanic measurement apparatus. For example, a resistive parameter related to a geologic formation is estimated through use of a model. An electrical excitation is coupled from a well tool in a borehole to the geologic formation. Induced voltages resulting from the excitation are received using monitor electrodes selected according to the specified excitation mode, including receiving magnitude and phase information corresponding to the induced voltages. The resistive parameter of the model is then determined using the magnitude and phase information of the received voltages, and using magnitude and phase information about the excitation.

Information about the magnitude and phase of the measurement, along with information about the magnitude and phase of the excitation are used to determine a formation resistivity (or conductivity), using a model-based approach including one or more real-valued (e.g., resistive) terms and one or more imaginary-valued (e.g., reactive) terms. In an example, one or more model parameters are determined, and re-used in subsequent resistivity determinations when one or more specified conditions are met.

Using a model-based approach, the resistivity measurement tool is capable of obtaining resistivity information over a larger range of formation and borehole parameters because inductive or capacitive coupling effects may be reduced or suppressed, in contrast to other approaches. Such model-based techniques may be combined with other approaches such as one or more of hardware or software based focusing techniques, as discussed in various examples below.

Figure 1:
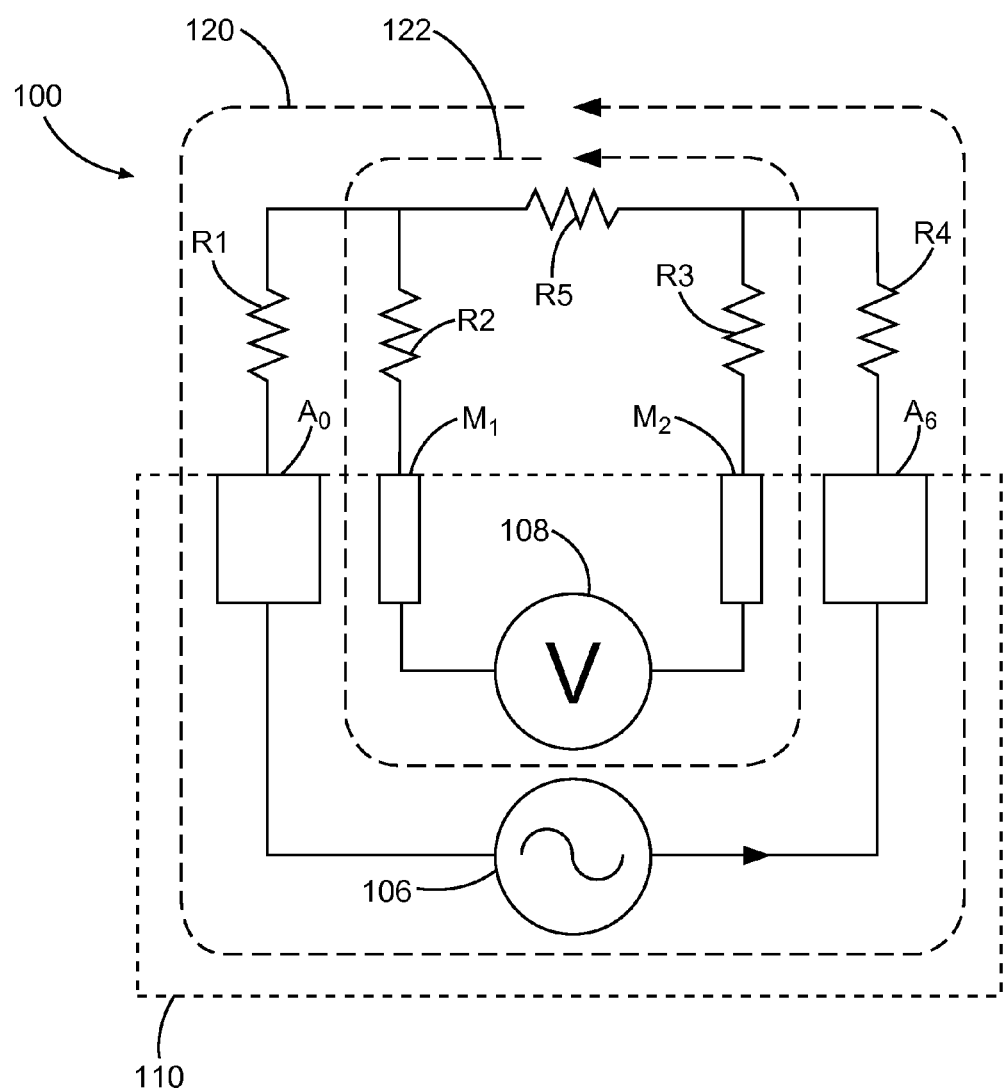
FIG. 1 illustrates generally a schematic representation of an example apparatus, that may include a galvanic measurement tool.

FIG. 1 illustrates generally a schematic representation of an example apparatus 100 including a galvanic measurement tool 110 for measuring a resistivity of a geologic formation. Generally, a formation resistivity measurement includes accurate measurement of very small signals (e.g., on the order of 1 microVolt (μV) or less in magnitude). For example, a highly-conductive drilling fluid or mud may have a resistivity of about 0.02 Ohm-meter (Ω-m) or less, and a highly resistive formation may have a resistivity of 10-100 kiloOhm-meter (kΩ-m) or more. Mutual or self-inductive effects and capacitive coupling effects create interference problems. Such interference generally causes errors that are larger than the magnitude of the small signals being measured. Such errors also adversely limit accuracy of resistivity determinations corresponding to relatively deeper depths of penetration of an excitation current into the formation in a direction extending radially outward from the tool, or such errors may limit a "vertical" resolution of an apparent resistivity determination with respect to varying depths along a longitudinal axis of a borehole.

The present inventors have recognized that, among other things, that a model-based approach may be used in a manner that separates sources of interference from the desired measurement, particularly in cases of relatively large self-susceptibility to crosstalk in voltage measurements. According to various examples, the model-based approaches described herein are applied to a variety of different resistivity (e.g., galvanic) measurement schemes, such as using an array laterolog tool, a through-casing resistivity tool, or galvanic permanent sensor, among others.

The illustration of FIG. 1 shows a generic galvanic tool 110 that operates at relatively low frequencies. Conduction is used for coupling of excitation current into the formation, and for measurement of a voltage developed by the excitation. For example, a pair of excitation electrodes, $A_0$ and $A_6$, may be used to conductively couple an excitation signal (e.g., a current) generated by an excitation circuit 106 to a geologic formation, such as having a formation resistance.

Respective monitor electrodes, such as a first monitor electrode $M_1$ and a second monitor electrode $M_2$ may be used to conductively measure a signal elicited by the excitation. Such measurement may include a voltage measurement, such as provided by a voltage measurement circuit 108. For example, a voltage difference measured between the first and second monitor electrode $M_1$, $M_2$ is generally represented as $V_{M12}=V_{M1}-V_{M2}$. Such a voltage measurement may be a direct differential measurement, or such a voltage measurement may be determined as a difference between absolute voltages measured respectively at the first and second monitor electrodes, $M_1$, $M_2$, such as with respect to a distally-located reference electrode (not shown). In the example of FIG. 1, a current source is described as the excitation circuit 106, and a voltage measurement circuit 108 provides measurement of a signal elicited by the excitation. However, the modeling techniques described above and below are generally applicable to voltage-excitation or current measurement as well.

At frequencies generally used for galvanic measurements, such as from about tens to about hundreds of Hertz, a region outside the tool 110 presents a predominantly resistive (e.g., real-valued) impedance, and such a resistance does not strongly depend on frequency in such a frequency range. Such resistance includes several component resistances that depend on the measurement or excitation electrode configuration, and which are represented by various resistances shown in FIG. 1, including a first resistance, R1, and a fourth resistance, R4, associated with the excitation current path 120 including the excitation electrodes $A_0$ and $A_6$. Similarly, a second resistance R2, and a third resistance R3, are associated with a measurement path 122.

A resistance presented to the tool 110 also includes a commonly-shared resistive component, R5. Such resistances are generally considered to be roughly constant with respect to small changes in frequency. Accordingly, an Ohm's law relationship would generally be expected to govern a voltage magnitude as a function of the resistance presented to the tool 110:

$$V=RI \quad (1)$$

However, in practice there are undesired effects in the measurement, such as due to interference effects from the tool configuration. As a result, the model shown in EQN. (1) above does not generally provide an accurate determination of a formation resistance in all measurement scenarios, when such a resistance is determined using voltages measured by the tool 110. One interference effect is the inductive effect produced by the excitation current that circulates in the formation and in the tool 110 conductors, through the excitation current path 120. A magnetic flux produced by the excitation current following the excitation current path 120 couples to the voltage measurement circuit defined by the measurement path 122, producing an electromotive force (EMF) in accordance with Faraday's law, which creates a large error voltage at the voltage measurement circuit 108.

In one approach, this inductive crosstalk effect may be reduced by certain wire configurations such as using twisted-conductor (e.g., twisted pair configuration) or otherwise attempting to reduce a measurement path 122 loop area. However, such inductive crosstalk cannot be completely removed using a purely mechanical approach. Such an inductive crosstalk effect induces a signal that can be imaginary-valued (e.g., having a 90 degree phase relationship to the real-valued resistive component of a measured signal), and a magnitude of the imaginary-valued term generally increases as frequency is increased. In some examples, a complex-valued model including the inductive effect is represented as, $$V=(R+j\omega L)I \quad (2)$$

where both I and V are complex-valued (e.g., "phasor") quantities, ω represents the radian frequency of the excitation signal, j represents the square root of (−1) (e.g., an imaginary-valued unit), R represents a resistive term including a contribution from a formation resistance, and L represents an inductive term.

According to various examples, I represents a complex-valued excitation current, having a known or measured magnitude and phase, and V represents a complex-valued voltage measurement including both magnitude and phase information, the phase determined with respect to the phase of excitation current or determined with respect to some other reference phase. The model of EQN. (2) may be further modified to include an electric field effect or capacitive effect. For example, such a capacitive effect may include portions of an excitation current path passing through dielectric or air-gap interfaces. The capacitive coupling effect generally decreases with frequency and is also imaginary-valued. In some examples, a complex-valued model including both inductive and capacitive effects is represented as, $$V = \left(R + j\omega L + \frac{1}{j\omega C}\right)I \quad (3)$$

where I and V are again complex-valued represent an excitation current and a measured voltage, respectively, and where a capacitive term, C, is included. The inductive term, jωL, of EQN. (3) may be omitted, to provide a model including only resistive and capacitive effects. However, the inductive crosstalk effect is generally significant and therefore not neglected.

In some examples, higher-order effects are included that are a polynomial function of frequency (e.g., having one or more of negative and positive exponents), such as to provide a more generalized model represented by, $$V=(R+\sum_{n=1}^{N}A_n(j\omega)^n+\sum_{n=1}^{N}B_n(j\omega)^{-n})I \quad (4)$$

where respective complex valued coefficients $A_n$ and $B_n$ are determined, corresponding to a series of N respective pairs of imaginary-valued terms $(j\omega)^n$ and $(j\omega)^{-n}$, where N is selected or specified as a desired model order.

In some example, additional complex-valued parameters C and D, are included in the model, to compensate for any multiplicative or additive effects such as phase shifts, and may provide an even more generalized model:

$$V=C(R+\sum_{n=1}^{N}A_n(j\omega)^n+\sum_{n=1}^{N}B_n(j\omega)^{-n})^{-n})I+D \quad (5)$$

For example, the complex-valued parameter C is referred to as a scaling parameter (not to be confused with the capacitive term "C" in the example of EQN. (3)), and the complex-valued parameter D is referred to as an offset parameter. As the model complexity increases (e.g., as more "unknowns" or parameters are included), respective measurements are made (or previous measurements are re-used) such that a number of measurements adequately determines the model parameters uniquely (e.g., providing a "critical solution"). In some example, measurements are made at respective different frequencies, specified over a range known to provide little variation in the real-valued resistive term, but specified to provide sufficient variation in the imaginary-valued parameters to allow reliable or unique determination of all parameters. As an illustration, in an example, the excitation includes exactly two different measurement frequencies, and in another example, the excitation includes more than two different measurement frequencies.

In order to uniquely determine a resistive parameter and a single reactive parameter (e.g., an inductive or capacitive parameter) using the model shown in EQN. (2), a minimum of two measurements would generally be required, such as obtained at different frequencies. A minimum of three measurements would generally be required to uniquely determine the resistive, inductive, and capacitive parameters, such as shown in the illustrative example of EQN. (3), if no model parameters are being reused. In this manner, the real-valued resistive component of the measurement may be separated from the imaginary-valued (e.g., reactive) components of the measurement associated with inductive crosstalk or capacitive effects. EQNS. (4) or (5) represent more general polynomial expressions, and a parameter fit may be performed using a larger set of measurement and excitation values in order to uniquely determine each parameter.

In another example, the excitation and corresponding measurement frequencies are regularly-spaced (e.g., including a fundamental frequency and harmonic frequencies specified as multiples of the fundamental frequency), and a Fourier series approximation is used as the model. In yet other examples, as discussed further elsewhere herein, such as below and in relation to FIG. 5, one or more model parameters are determined during one series of measurements, and reused, such as to enhance efficiency or reduce a number of measurements required for subsequent determinations of other parameters in the model.

In general, a technique for using one or more of the models above includes making amplitude and phase measurements of a complex-valued voltage, V, received from one or more monitor electrodes, at N frequencies, and such complex-valued measurements are represented as $|V_i|$ (e.g., a voltage magnitude) and $\angle V_i$ (e.g., a voltage phase), respectively, for the "ith" measurement frequency. Similarly, amplitude and phase measurements of the complex-valued current, I, are made at each frequency and may be represented respectively as $|I_i|$ and $\angle I_i$, or $\angle I_i$ is assigned as a zero-degree (or other) phase reference. The phase measurements need not be absolute. For example, one or more parameter calculations may be performed using a relative phase or phase difference between a voltage and a current signal. Measurement error is reduced or suppressed by making the respective current and voltage measurements contemporaneously with each other at each measurement frequency, though this is not required.

After the complex-valued voltages and currents have been determined (or provided, such as if the amplitude or phase of one or more voltages or currents is known or controlled), the set of voltages and currents are fit to a selected model or applied to a selected model solution. In some examples, parameters such as R, L, C, $A_n$ or $B_n$ are determined. The following examples include fits based on critical solutions (e.g., where a number of unknowns is equal to a number of equations):

Solution to EQN. (1): \hfill (6)

$$R = \frac{|V|}{|I|}\cos(\angle V - \angle I)$$

Solution to EQN. (2): \hfill (7)

$$R = \left(\frac{\omega_2 \frac{|V_1|}{|I_1|}\cos(\angle V_1 - \angle I_1) - \omega_1 \frac{|V_2|}{|I_2|}\cos(\angle V_2 - \angle I_2)}{\omega_2 - \omega_1}\right)$$

Solution to EQN. (3): \hfill (8)

$$\text{solve}\begin{bmatrix} 1 & j\omega_1 & \frac{1}{j\omega_1} \\ 1 & j\omega_2 & \frac{1}{j\omega_2} \\ 1 & j\omega_3 & \frac{1}{j\omega_3} \end{bmatrix}\begin{bmatrix} R \\ L \\ \frac{1}{C} \end{bmatrix} = \begin{bmatrix} \frac{V_1}{I_1} \\ \frac{V_2}{I_2} \\ \frac{V_3}{I_3} \end{bmatrix}$$

EQN. (8) above may be further generalized to provide a system of equations corresponding to each parameter R, An, Bn in the polynomial model of EQN. (4), or including the complex-valued parameters C, or D, as shown in EQN. (5). In the examples of various solutions provided above, the R value (resistive term) may be determined to provide an extracted resistance for which crosstalk effects or other non-resistive effects have been suppressed or removed. Such a resistance may correspond to a formation resistance, or may be used in further processing such as to determine or estimate an apparent formation resistivity.

According to various examples, the modeling and solution techniques described above involve measurements acquired at multiple excitation frequencies. If bandwidth is limited, or if a total measurement duration is limited, an insufficiency of a number of available measurements may preclude unique determination of every model parameter for every series of measurements, particularly for higher model orders using the generalized polynomial models of EQNS. (4) and (5).

Accordingly, the present inventors have also recognized, among other things, that during a particular resistive parameter fit or solution, measurement duration or a number of measurements is reduced when one or more model parameters are predetermined or reused. As an illustrative example, a full set of measurements are acquired during a first iteration, such as during a calibration operation, or during development, and various model parameters L, C, $A_n$ or $B_n$, are determined corresponding to specified measurement conditions. The specified measurement conditions may include using information about one or more of a tool or borehole geometry (e.g., a standoff distance between an electrode located on a tool surface and a surround borehole or casing), temperature, formation resistivity, mud resistivity, or depth, for example.

For example, when particular conditions are met, a single measurement (e.g., at a single frequency) or a reduced set of measurements are performed (e.g., at a reduced number of frequencies as compared to a full or critically-determined set of measurement frequencies), and the resistive term in the model, R, is determined or updated reusing one or more other predetermined parameters L, C, $A_n$, $B_n$, C, or D, or deriving values of such parameters from a prior iteration or from stored information such as from one or more tables of values or correlations.

As an illustration, the first iteration and subsequent iterations may be performed respectively at different measurement depths during resistive logging. For example, the first iteration may be made at or near the surface of a borehole, such as during a calibration operation including a known or controlled temperature. Then, subsequent measurements may be downhole measurements such as performed in a tool environment where the temperature is similarly known or controlled, or wherein the temperature dependence of one or more model parameters is deterministic. See FIG. 5, for example.

Figure 2:
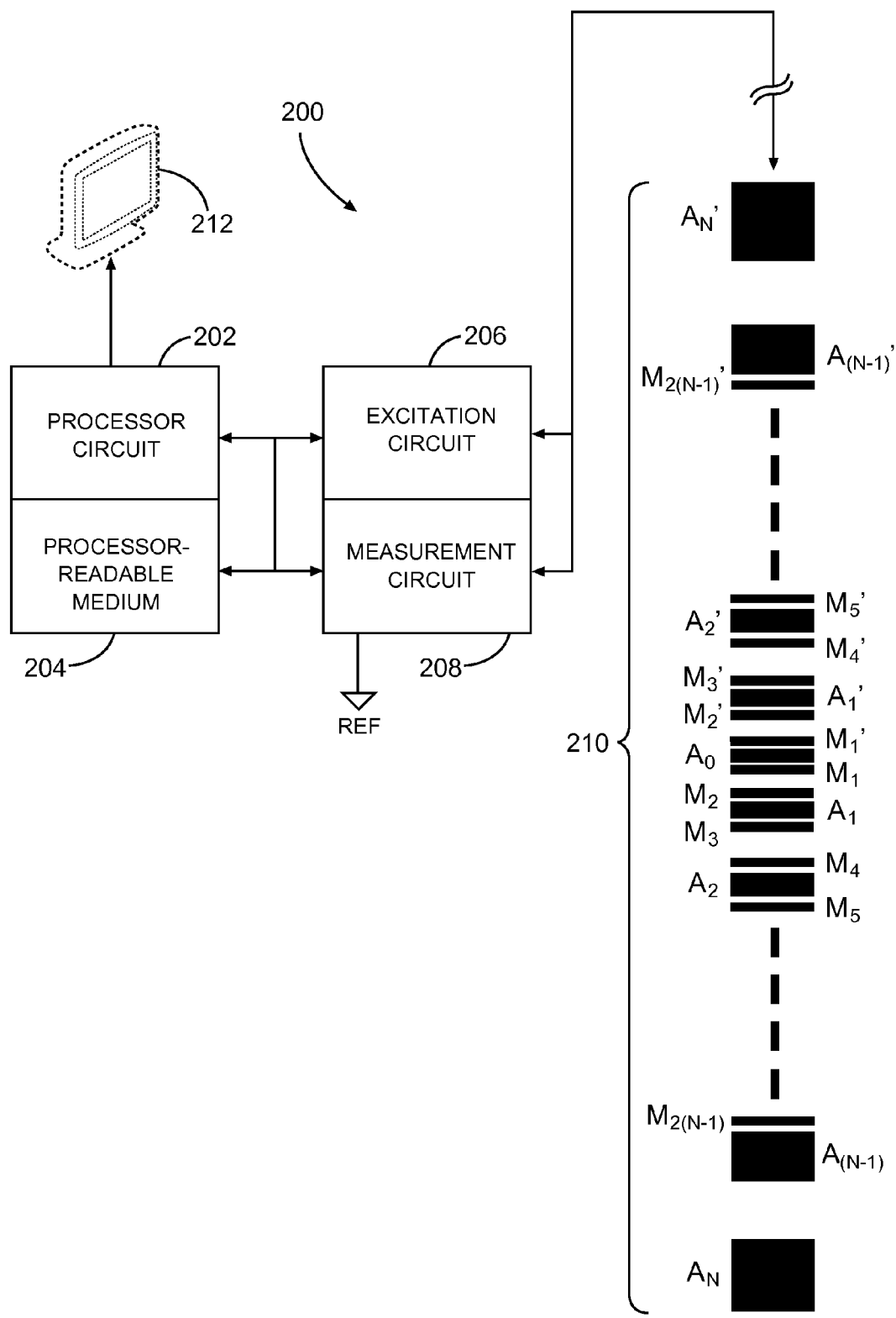
FIG. 2 illustrates generally an example of an apparatus, including an array of current and monitor electrodes, such as for obtaining information indicative of a formation resistivity.

FIG. 2 illustrates generally an example of an apparatus 200, including an electrode array 210 of current and monitor electrodes, such as for obtaining information indicative of a formation resistivity. The techniques discussed above in relation to FIG. 1 need not be restricted to a single pair of excitation electrodes or a single pair of monitor electrodes. A laterolog or guard log configuration may be used, such as may include an array laterolog configuration as shown in the illustration of FIG. 2.

An array laterolog tool, such as including the electrode array 210, is generally used to obtain information indicative of a resistivity (or conductivity) of portions of a geologic formation at a variety of radial depths extending laterally outward from the array. Such information from multiple depths may be used to correct for effects related to the presence of borehole and invasion layers, such as for determination of an "apparent" or corrected formation resistivity.

In FIG. 2, the electrode array 210 may include ring-shaped electrodes, such as located along a longitudinal axis of a tool body sized and shaped for deployment within a borehole. Other electrode shapes may be used, such as rectangular or button-shaped electrodes. Such electrodes can be arranged or spaced radially around a tool body or otherwise arranged on the tool body.

Figure 6:
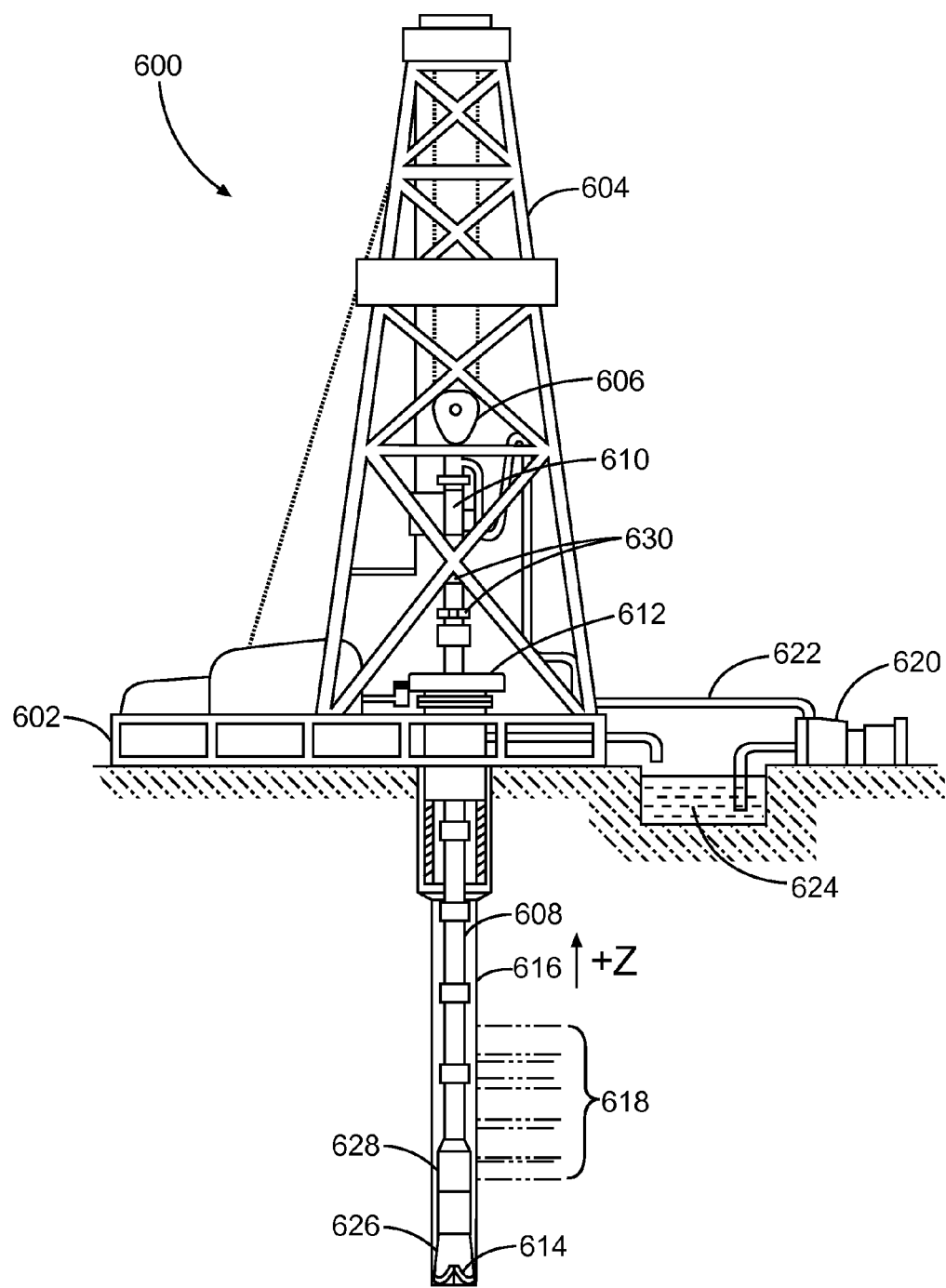
FIG. 6 illustrates generally an example of a drilling apparatus, that may include a measure-while-drilling (MWD) or log-while-drilling (LWD) capability.
Figure 7:
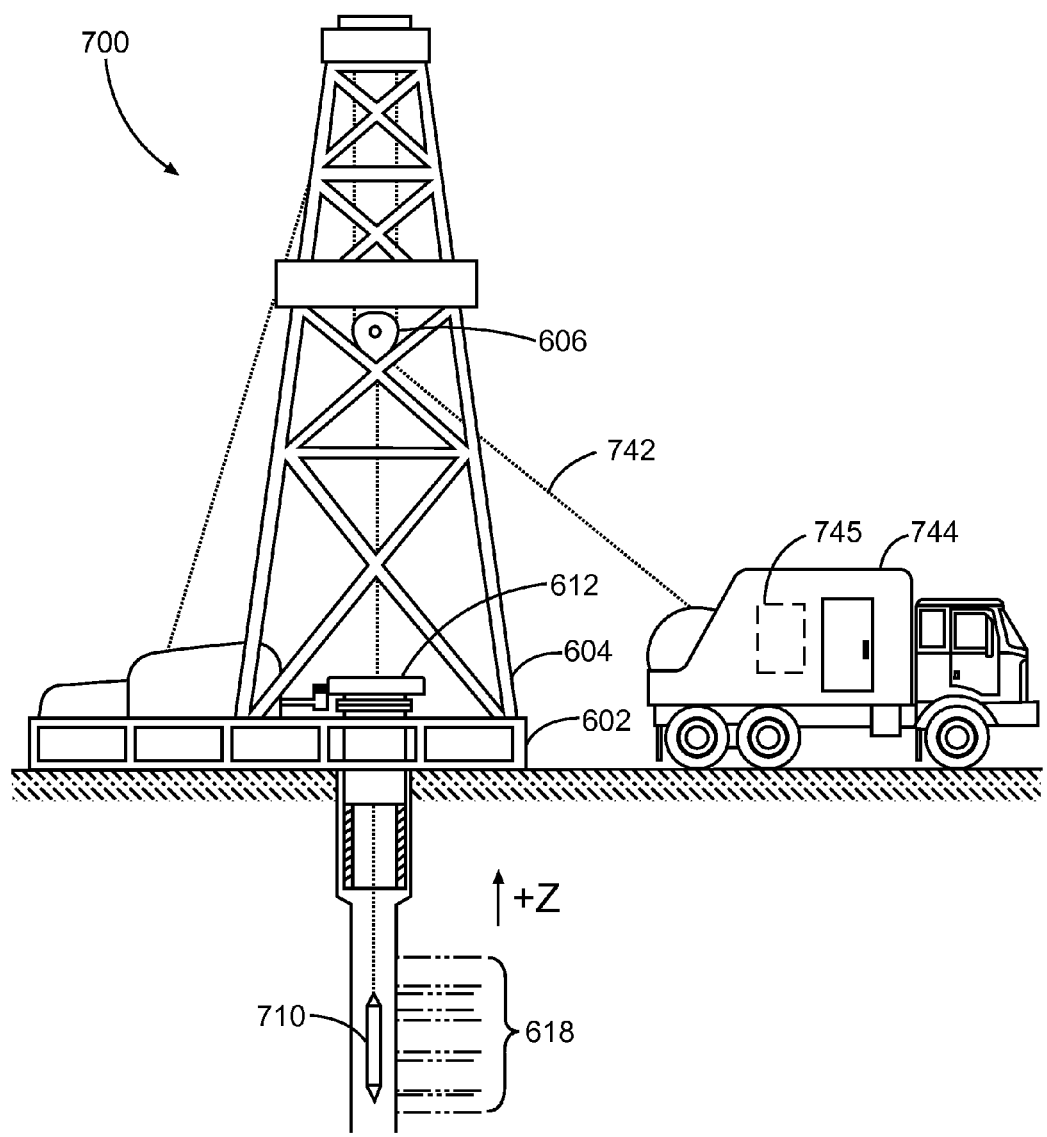
FIG. 7 illustrates generally an example of a wireline logging apparatus.

The electrode array 210 may be included as a portion of a drill string in a log-while-drilling (LWD) application (e.g., as shown in FIG. 6), or the electrode array 210 may be included as a portion of a wireline sonde (e.g., as shown in FIG. 7). Other configurations may be used, such as including a tubing-conveyed downhole logging configuration.

The electrode array 220 is coupled to a excitation circuit 206 and a measurement circuit 208, such as controlled by a processor circuit 202 according to instructions stored in a processor-readable medium 204. The processor circuit 202 and processor-readable medium 204 may be located within a tool body or sonde downhole, or as a portion of a surface processing system. For example, the processor circuit 202 may be coupled to a display 212, such as to present information indicative of a formation resistivity to a user, or to provide other information regarding status or control of various portions of the apparatus 200.

The phrase "processor-readable medium" shall be taken to include any tangible non-transitory device which is capable of storing or encoding a sequence of instructions for execution by the machine and that causes the machine to perform any one of the described and/or claimed methodologies. Such a processor-readable medium 104 includes a machine-readable medium or a computer-readable medium. The term "non-transitory medium" expressly includes all forms of storage devices, including drives (optical, magnetic, etc.) and all forms of memory devices (e.g., Dynamic Random Access Memory (DRAM), Flash (of all storage designs, including NAND or NOR topologies), Static Random Access Memory (SRAM), Magnetic Random Access Memory (MRAM), phase change memory, etc., as well as all other structures designed to store information of any type for later retrieval. In an example, one or more of the techniques described herein, such as the techniques shown in FIG. 1, 4, or 5 may be implemented at least in part as instructions stored on the processor-readable medium 204. Such instructions cause the processor circuit 202 or other portions of the apparatus 200 to perform various operations, such as including portions or entireties of one or more techniques described herein.

In an electrical context, use of the phrase "coupled" or "coupling" may refer to either direct coupling, such as conductive electrical coupling (e.g., as in the example of excitation currents conductively coupled into a formation), or indirect coupling (e.g., wireless, reactive, or electromagnetic coupling). In the mechanical context, "coupled" or "coupling" may refer to a direct mechanical connection, or an indirect mechanical connection through one or more other mechanical portions of an example.

In the illustrative and generalized example of the electrode array 210 of FIG. 2, a centrally-located electrode $A_0$ is designated as a "survey electrode," which in this example is coupled to the excitation circuit 106 and other electrodes $(A_1, A_1', \ldots, A_N, A_N')$, be referred to as "guard electrodes" are also coupled to the excitation circuit 206. A respective combination of the 2N guard electrodes and the survey electrode, $A_0$, is used to couple an excitation generated by the excitation circuit 206 (e.g., one or more conductively coupled currents) to a formation from a location within a borehole. The respective combination is established according to a specified excitation mode. Examples of such excitation modes are shown illustratively in FIG. 3, and corresponding focusing modes may be established using the information obtained from each excitation mode.

Focusing generally takes advantage of the principle of superposition in order to combine measurements from respective excitation modes such that the current emitted from a survey electrode travels in a path radially outward from the survey electrode, rather than "short circuiting" through the mud or other borehole medium without penetrating into the formation. For example, a potential difference between specified combinations of monitor electrodes may be set to zero, thus suppressing or inhibiting a flow of excitation current locally in the direction of equipotentially-driven monitor electrodes.

Such an equipotential condition may be established such as by varying respective excitation current magnitudes so that the equipotential criterion is met (e.g., a "hardware focusing" approach), or by appropriately weighting contributions from each excitation current by processing signals received using the monitor electrodes (e.g., a "software focusing" approach). For example, such currents may be distinguished such as by using a unique excitation frequency or range of frequencies for each excitation current, allowing measurements for multiple modes to be made simultaneously or contemporaneously. In another approach, such as discussed below in relation to the time-domain pulse technique, respective excitations from respective excitation electrode combinations are staggered with respect to time.

In respective focusing modes, excitation current may controlled or measurements may be processed to provide a return path for the survey current using different guard electrodes in each mode. A depth of a formation probed by such excitation current is generally proportional to the separation between the current emitting electrode and the return electrode, so different linear combinations of excitation modes may be employed to make measurements at different depths of investigation as a result. Generally, successively higher modes correspond to deeper radial distances of penetration into the formation with respect to the survey electrode.

Figure 3:
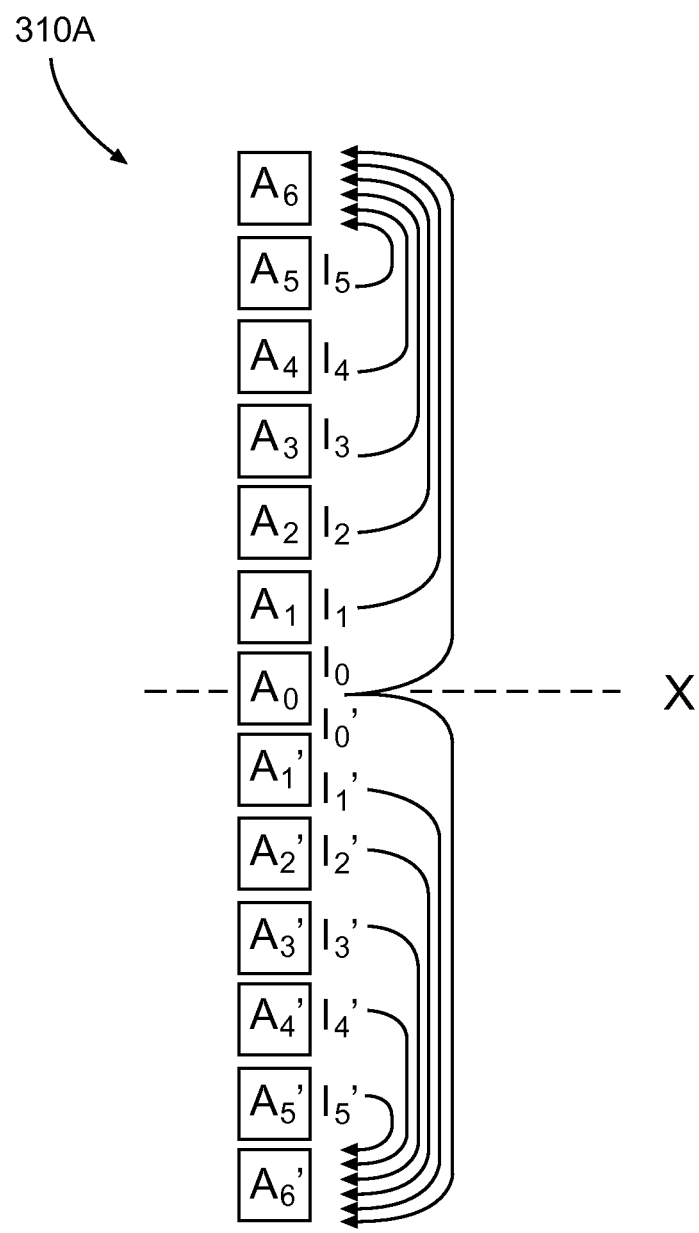
FIG. 3 illustrates generally an example of respective excitation modes provided by an array of current electrodes, arranged symmetrically about a central axis, such as included as a portion of an array laterolog tool.

A variety of techniques may be used to establish the excitation modes of FIG. 3, or focusing modes derived from such excitation, such as including one or more of software- or hardware-based focusing techniques. In many examples, an excitation current injected into the formation using the excitation electrodes $A_0$ and $A_1, A_1', \ldots, A_N, A_N'$ will induce respective voltages which are received using one or more monitor electrodes, such as the 4N-4 monitor electrodes $(M_1, M_1', M_2, M_2', \ldots, M_{2(N-1)}, M_{2(N-1)}')$ shown in the illustrative example of the electrode array 210. The monitor electrodes may be coupled to a measurement circuit 208, to receive voltages induced in response to the specified current excitation mode.

An excitation is generally a current injected into the formation by a specified combination of excitation electrodes according to the selected excitation mode. In many examples, an excitation generated according to the selected excitation mode will include a specified alternating current (AC) current waveform at a specified frequency. In this manner, more than one excitation can be provided simultaneously, using different respective excitation frequencies corresponding to respective excitation modes.

In another approach, according to various examples, a time-domain pulse such as a square-wave pulse, chirped pulse, or multi-tone pulse is provided by the excitation circuit as the electrical excitation. The pulse is shaped to include energy at multiple frequencies. Frequency control is generally accomplished by control of pulse parameters such as rise time, fall time, pulse duration, duty cycle, and repetition rate, for example. In the example of a chirped excitation pulse, a rapid continuous or discrete sweep across a range of frequencies is performed over the duration of a specified pulse width, with the range including the desired multiple frequencies. In the example of a multi-tone pulse, a time domain pulse is establishing having energy at two or more discrete frequencies, such as by synthesizing a time-domain waveform including two or more sinusoidal waveforms added together, and time gating the synthesized waveform using a specified window shape (e.g., a Gaussian window, a "box car" window, or another shape).

In such a time-domain pulse example, the measurement circuit 208 is generally configured to receive a time-domain signal induced by the excitation. The time-domain signal is then transformed (e.g., using a discrete Fourier transform, a Fast Fourier Transform, or other transform) to provide a frequency domain representation. The frequency domain representation may include magnitude information (e.g., a real-valued transform) or may include magnitude and phase information (e.g., a complex-valued transform). For example, a magnitude or phase of a particular portion of the frequency domain representation is extracted, such as corresponding to one or more specified frequencies of interest. In this manner, information about multiple frequencies is received simultaneously or contemporaneously using a time-domain excitation pulse.

In some examples, the measurement circuit 208 includes or is coupled to one or more comparator circuits, for use in determining whether to use a model based approach for determining a resistance or resistivity presented to the tool 210, such as in response to detected noise or crosstalk. The excitation circuit 206 and measurement circuit 208 may be operated under the control of a processor circuit 202, such as including or coupled to a processor-readable medium 204 storing instructions executable by the processor circuit 202, or for storing information related to an excitation, measurement, or estimation technique as discussed elsewhere herein. The processor circuit 202 may be coupled to a communication circuit. For example, the communication circuit may include one or more of a wireless transmitter, receiver or transceiver, such as using an inductive, radiative (e.g., electromagnetic), or acoustic (e.g., mud pulsing) communication scheme. The communication circuit may use other techniques to transmit or receive information, such as a fiber-optic or other optical communication scheme.

In an illustrative example, the apparatus 200 may be located downhole, such as included as a portion of an MWD/LWD logging system or as a portion of a wireline sonde. Alternatively, or in addition, a processor circuit 202 may be located on the surface, communicatively coupled to one or more of the excitation circuit 206 or measurement circuit 208 to obtain information indicative of formation resistivity, or to provide processing capability such as to determine one or more measurement estimates related to or in support of an apparent formation resistivity determination.

FIG. 3 illustrates generally an example of a current excitation mode provided by an array of current electrodes 310A, arranged symmetrically about a central axis, "x." Generally, "N" different excitation modes are defined, and in the illustrative example of FIG. 3, N equals 6. The array of current electrodes 310A may include ring-shaped electrodes arranged along a longitudinal axis of a tool body, such as discussed in examples elsewhere herein. The spacing and shape of respective current electrodes need not be uniform, and are merely shown as uniform in FIG. 3 for purposes of illustrating examples of the current excitation configurations.

FIG. 3 shows respective excitation currents $I_0$ through $I_5$ circulating between respective current electrodes $A_0$ through $A_5$ and a commonly-shared return electrode, $A_6$ and symmetrically located electrodes $A_0'$ through $A_5'$ circulating respective excitation currents $I_0'$ through $I_5'$ to a commonly-shared return electrode, $A_6'$. In examples where $A_6$ and $A_6'$ are conductively coupled together or where the excitation currents are otherwise adjusted to provide an equipotential condition between $A_6$ and $A_6'$, a current coupled from a particular electrode, such as $A_5$, will return using both electrode $A_6$ and electrode $A_6'$. For example, currents from non-"primed" electrodes may return using $A_6'$, and vice versa. In some examples, for simplicity, only half of the symmetrically-located electrodes may be shown or discussed, but such discussion may generally be applicable to the full array as shown and discussed in FIG. 2.

The electrode array 210 shown in FIG. 2 is operable using a variety of different excitation schemes. Measurements received from respective monitor electrodes in the various excitation modes may be combined or otherwise processed to provide focusing modes established to investigate respective radial depths in a formation. In many examples, measurements from respective excitation modes are respectively processed using a model-based technique as discussed in relation to the single excitation electrode pair of the examples of FIG. 1.

For example, using the notation shown in FIG. 1, "N" different excitation modes may be used, such as including modes that may be represented by the following excitation relationships for each current electrode:

Excitation Mode 1: $I_{A_0} = 1$ Amperes;

$$I_{Ai} + I'_{Ai} = 0, i = 1, \ldots, N-1$$

Excitation Mode 2: $I_{A_1} + I'_{A_1} = 1$ Amperes; $I_{A_0} = 0$;

$$I_{Ai} + I'_{Ai} = 0, i = 2, \ldots, N-1$$

⋮

Excitation Mode N: $I_{A_{N-1}} + I'_{A_{N-1}} = 1$ Amperes; $I_{A_0} = 0$;

$$I_{Ai} + I'_{Ai} = 0, i = 1, \ldots, N-2$$

In the examples of excitation modes shown above, $I_{Ai}$ represents the current emitted from a respective electrode, $A_i$. In these excitation mode examples, currents are returned respectively to excitation electrodes $A_N$ and $A_N'$.

In the illustrative example of FIG. 3, N=6, and the excitation modes may be defined as follows:

Excitation Mode E1: $I_{A_0} = 1$ Ampere; Returning on $I_{A_6} + I'_{A_6}$

Excitation Mode E2: $I_{A_1} + I'_{A_1} = 1$ Ampere;

Returning on $I_{A_6} + I'_{A_6}$

⋮

Excitation Mode E6: $I_{A_5} + I'_{A_5} = 1$ Ampere;

Returning on $I_{A_6} + I'_{A_6}$

As discussed in other examples herein, absolute or differential voltages may be measured using respective monitor electrodes, in each of the excitation modes. In some systems, a voltage-controlled scheme can be used as an alternative to the current-controlled scheme described generally above. In such examples, voltages of respective current electrodes are adjusted to provide the excitation. A hardware or software focusing technique may be used to provide respective focusing modes corresponding to different radial depths of investigation.

Figure 4:
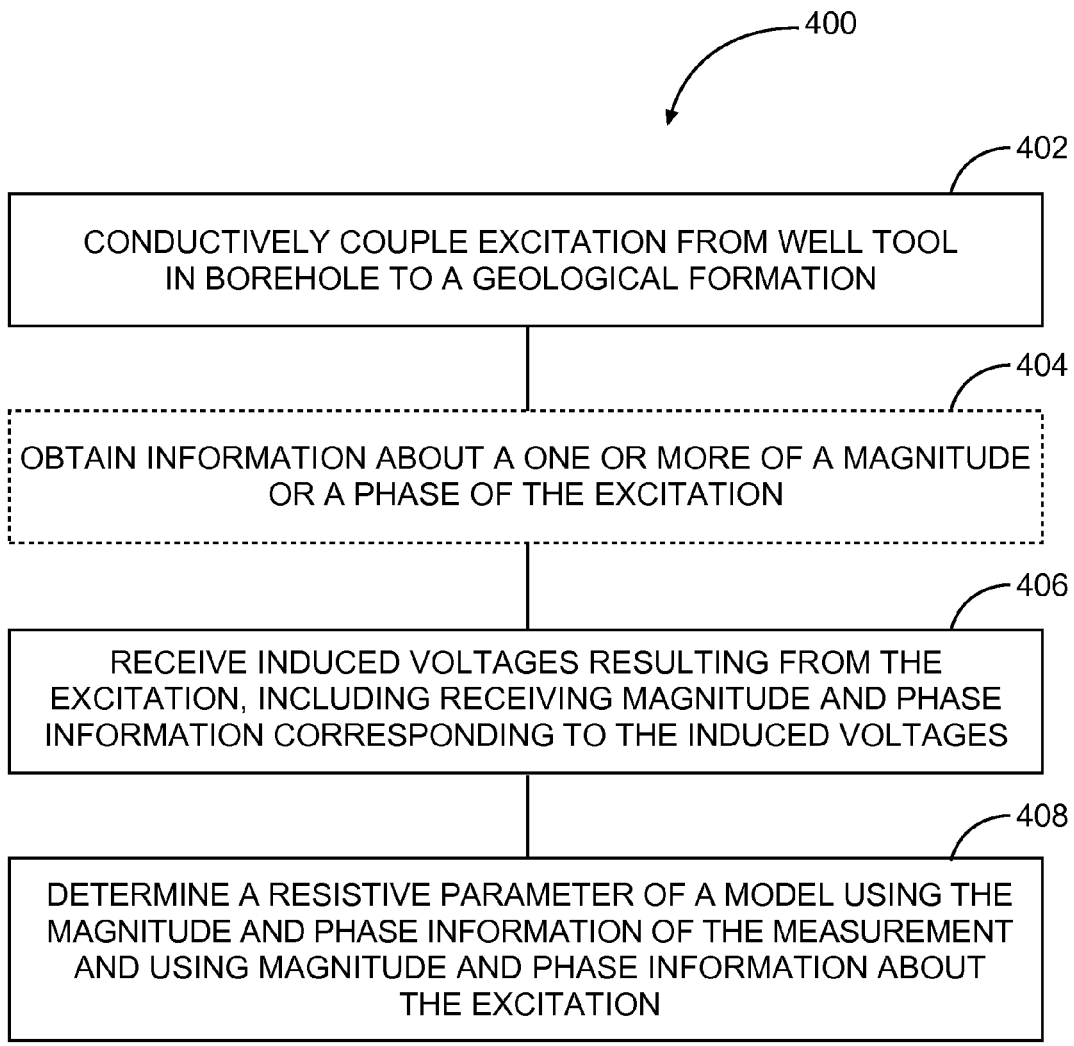
FIG. 4 illustrates generally an example of a technique, such as a method, including determining a resistive parameter of a model using conductively obtained information elicited by an excitation.
Figure 5:
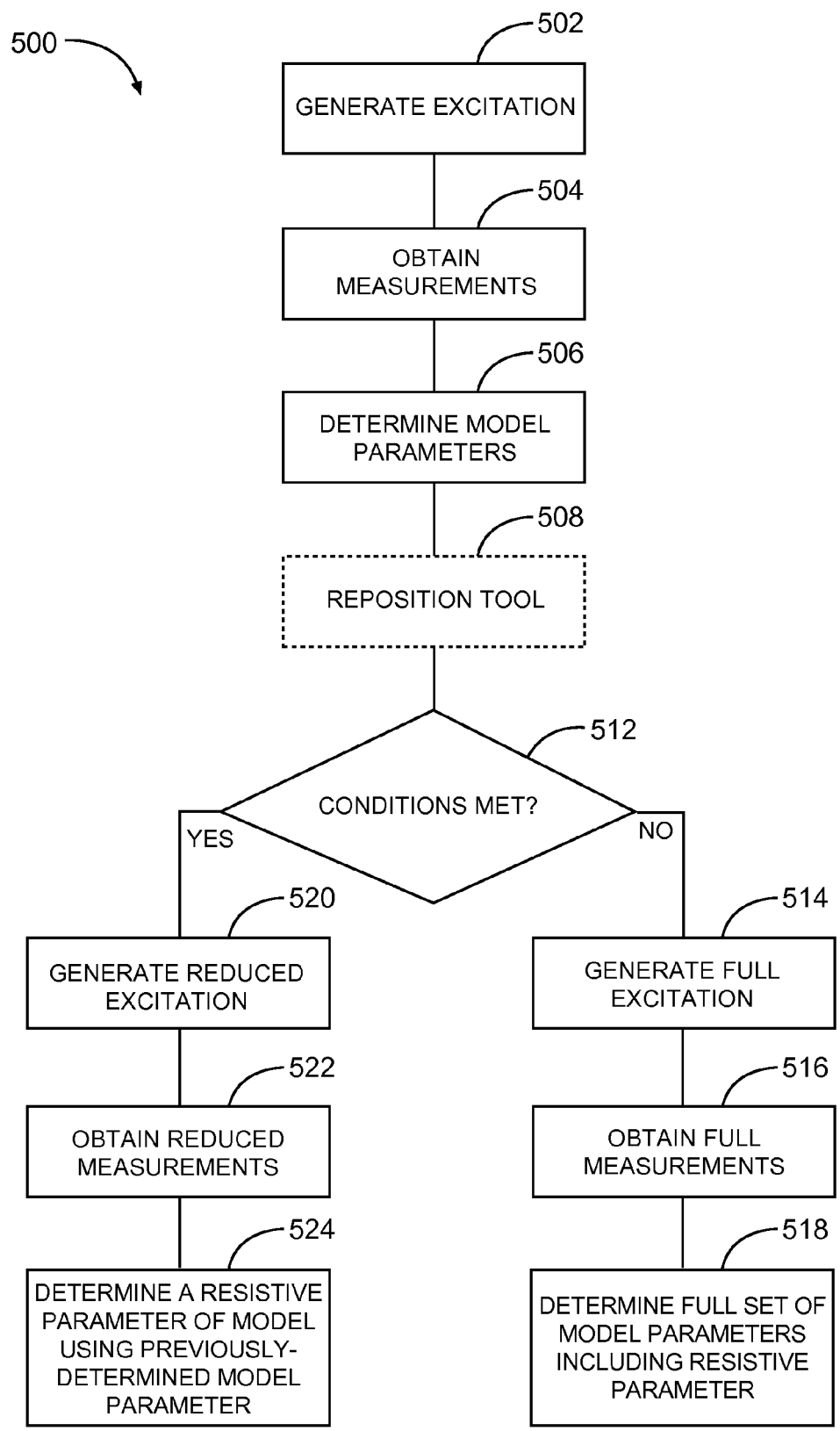
FIG. 5 illustrates generally an example of a technique, such as a method, including determining a resistive parameter of a model using conductively obtained information elicited by an excitation, such as may include reusing one or more previously-determined model parameters.

Accordingly, the model-based techniques described in relation to the examples of FIG. 1 and other examples, such as shown below in FIGS. 4 and 5, are applied to differential voltage measurements (e.g., including a differential voltage magnitude and a differential voltage phase), absolute voltage measurements (e.g., with respect to a distally-located reference electrode, such as "REF" as shown in the example of FIG. 2), or to current measurements (e.g., an excitation current corresponding to an excitation mode).

FIG. 4 illustrates generally an example 400 of a technique, such as a method, including determining a resistive parameter of a model using conductively obtained information elicited by an excitation. FIG. 4 may include one or more techniques or may use apparatus discussed in examples elsewhere, such as the model-based techniques described in relation to FIG. 1.

At 402, an excitation is coupled to a geologic formation, such as by apparatus shown in the examples of FIGS. 1 through 3 or elsewhere. In many examples, such excitation is a current coupled to a formation using respective excitation electrodes established according to a specified excitation mode. At 404, optionally, information about one or more of a magnitude or phase of the generated excitation is measured or provided. Depending on the scheme used for synthesis of the excitation signal, a magnitude or phase may be known. Or, one or more of the magnitude or phase of the excitation signal may be monitored, such as contemporaneously with monitoring of the signal (e.g., a voltage) developed in the formation by the excitation signal.

At 406, information about a signal developed by the excitation is received, using respective monitor electrodes established according to the specified excitation mode. For example, such monitor electrodes are included as a portion of an array laterolog apparatus, such as shown in the example of FIG. 2. Such information obtained by the monitor electrodes generally includes magnitude and phase information, including an absolute phase determined with respect to a reference signal, or a relative phase with respect to the excitation signal, for example. At 408, a resistive parameter of a model is determined, using the magnitude and phase information of the measurement, and magnitude and phase information about the excitation.

FIG. 5 illustrates generally an example 500 of a technique, such as a method, including determining a resistive parameter of a model using conductively obtained information elicited by an excitation, such as may include reusing one or more previously-determined model parameters. FIG. 5 may include one or more techniques or may use apparatus discussed in examples elsewhere, such as the model-based techniques described in relation to FIG. 1.

At 502, an excitation may be generated and coupled to a geologic formation, such as using apparatus shown in the examples of FIGS. 1 through 3 or elsewhere. At 504, measurements are obtained, using respective monitor electrodes established according to the specified excitation mode. For example, such measurements can include receiving voltages induced by the excitation, including receiving magnitude and phase information. At 506, respective model parameters are determined.

The model parameters determined at 506 may include all model parameters for one or more of the models of EQNS. (1) through (5) discussed in relation to FIG. 1. In some example, such determination comprises a first measurement iteration or calibration operation, performed at the surface or near the surface within a borehole. At 508, optionally, the tool including excitation and monitor electrodes may be repositioned.

At 512, if specified measurement conditions are met, then at 520 a reduced number of excitation frequencies is used. At 522, measurements corresponding to the reduced number of excitation frequencies may be made, and at 524 a resistive term may be determined using a solution technique where one or more model parameters may be predetermined or reused (such as previously determined at 506), to improve measurement efficiency. Such specified measurement conditions may include information or constraints related to one or more of a tool or borehole geometry (e.g., a standoff distance between an electrode located on a tool surface and a surround borehole or casing), temperature, formation resistivity, mud resistivity, depth, or an elapsed time, for example.

If the specified measurement conditions are not met, then at 514, a full suite of excitation signals is generated, and at 516 a full suite of measurements associated with each excitation frequency is obtained so that each model parameter can be determined. At 518, a resistive parameter of the model may be determined, by solving for all other model parameters, or at least by solving for a superset of model parameters as compared to the resistivity determination at 524 where one or more model parameters is reused or predetermined.

FIG. 6 illustrates generally an example of a drilling apparatus 600, such as including a measure-while-drilling (MWD) or log-while-drilling (LWD) capability. The illustrative example of FIG. 6 may include apparatus such as shown in FIGS. 1 through 3, or may be used with techniques discussed in relation to FIGS. 1 through 5 or elsewhere.

A drilling rig or platform 602 generally includes a derrick 604 or other supporting structure, such as including or coupled to a hoist 606. The hoist 606 may be used for raising or lowering equipment or other apparatus such as drill string 608. The drill string 608 may access a borehole 616, such as through a well head 612. The lower end of the drill string 608 may include various apparatus, such as a drill head 614, such as to provide the borehole 616. A drilling fluid or "mud" may be circulated in the annular region around the drill head 614 or elsewhere, such as provided to the borehole 616 through a supply pipe 622, circulated by a pump 620, and returning to the surface to be captured in a retention pit 624 or sump. Various subs or tool assemblies may be located along the drill string 608, such as include a bottom hole assembly (BHA) 626 or a second sub 628.

As the BHA 626 or second sub 628 pass through various regions of a formation 618, information may be obtained. For example, the BHA 626, or the second sub 628, may include apparatus such as shown in the examples of FIG. 1 or 2, such as to obtain array laterolog measurements for use in determining an apparent formation 618 resistivity. The second sub 628 may include wireless telemetry or logging capabilities, or both, such as to transmit or later provide information indicative of a formation resistivity to operators on the surface or for later access in evaluation of formation 618 properties. For example, portions 630 of the apparatus 600 at the surface may include one or more of wireless telemetry, processor circuitry, or memory facilities, such as to support log-while-drilling (LWD) or measurement-while-drilling (MWD) operations. In particular, the apparatus 100 or 200 of FIG. 1 or 2 may be included as a portion of the BHA 626, the second sub 628, or elsewhere.

FIG. 7 illustrates generally an example of a wireline logging apparatus. The illustrative example of FIG. 7 may include apparatus such as shown in FIGS. 1 through 3, or may be used with techniques discussed in relation to FIGS. 1 through 5 or elsewhere. Similarly to the example of FIG. 6, a hoist 606 may be included as a portion of a platform 602, such as coupled to a derrick 604, and used to raise or lower equipment such as a wireline sonde 710 into or out of a borehole. In this wireline example, a cable 742 may provide a communicative coupling between a logging facility 744 (e.g., including a processor circuit 745 or other storage or control circuitry) and the sonde 710. In this manner, information about the formation 618 may be obtained, such as using an array laterolog configuration or other measurement configuration for the sonde 734 as discussed in other examples herein. In particular, the apparatus 100 or 200 of FIG. 1 or 2 may be included as a portion of the wireline sonde 710.

For purposes of illustration, the examples of FIGS. 6 and 7 show a vertically-oriented borehole configuration. However, the apparatus and techniques described herein may also be used in other borehole configurations, such as a borehole including a horizontal penetration direction, or an oblique borehole configuration, for example. The examples of FIGS. 6 and 7 also generally illustrate land-based examples. But, apparatus and techniques described herein may be used in offshore environments as well, such as for subsea operations. In particular, offshore or subsea operations may include use of wireline or LWD/MWD apparatus and techniques including aspects of the examples herein.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The claimed invention is:

1. A method comprising:
exciting excitation electrodes attached to a well tool to produce a first set of excitation signals, wherein the first set of excitation signals comprise a plurality of frequencies;
determining a first set of induced voltage measurements with monitor electrodes attached to the well tool, wherein the first set of induced voltage measurements are induced by the first set of excitation signals;
determining a set of model parameters based on the first set of induced voltage measurements;
repositioning the well tool to a new depth in a borehole;

determining whether a specified measurement condition is met; and in response to the specified measurement condition being met, determining a resistive parameter based on the set of model parameters and on a second set of induced voltage measurements, wherein the second set of induced voltage measurements are induced by a reduced set of excitation signals, and wherein the reduced set of excitation signals comprises a number of frequencies fewer than the plurality of frequencies.

2. The method of claim 1, wherein at least one parameter of the set of model parameters is determined while the well tool is outside the borehole.

3. The method of claim 1,
wherein each of the first set of excitation signals comprises excitation energy at different frequencies; and
wherein determining the first set of induced voltage measurements comprises determining respective induced voltages corresponding to the different frequencies of the excitation energy.

4. The method of claim 3, wherein determining the respective induced voltages comprises obtaining magnitude and phase information for an induced voltage at each of the different frequencies of the excitation energy.

5. The method of claim 3, wherein the set of model parameters comprises a reactive parameter.

6. The method of claim 5, wherein the reactive parameter comprises a capacitive parameter.

7. The method of claim 5, wherein the reactive parameter comprises an inductive parameter.

8. The method of claim 7,
wherein the resistive parameter corresponds to a formation resistance; and
wherein the inductive parameter corresponds to an inductance provided at least in part by a current path including a tool that houses one or more of the excitation electrodes or the monitor electrodes.

9. The method of claim 8, wherein the inductive parameter corresponds to a mutual inductance between an excitation path and a measurement path.

10. The method of claim 3, wherein a count of induced voltage measurements is equal to or greater than a count of model parameter values to be determined.

11. The method of claim 3, wherein the set of model parameters are part of a model that comprises a polynomial model.

12. The method of claim 11, wherein the polynomial model includes a scaling parameter having a real-valued part and an imaginary-valued part and an offset parameter having a real-valued part and an imaginary-valued part.

13. The method of claim 11, wherein the polynomial model includes respective imaginary-valued parameters having negative and positive exponents.

14. The method of claim 13,
wherein the polynomial model comprises respective coefficients for the respective negative and positive imaginary-valued parameters; and
wherein determining the resistive parameter comprises determining the resistive parameter based on the respective coefficients.

15. The method of claim 3,
wherein determining respective induced voltages corresponding to the different frequencies comprises using regularly-spaced frequencies; and
wherein the set of model parameters are part of a model that comprises a Fourier series approximation.

16. The method of claim 1, wherein the electrical excitation comprises a current provided by a current source.

17. The method of claim 1,
wherein the electrical excitation comprises a time domain pulse including energy at multiple specified frequencies;
wherein determining the first set of induced voltage measurements comprises receiving a time-domain voltage signal induced by the first set of excitation signals; and
wherein determining the resistive parameter comprises:
transforming the time-domain voltage signal into a frequency-domain representation; and
identifying a magnitude and phase of portions of the frequency-domain representation corresponding to specified ones of the multiple specified frequencies.

18. The method of claim 1, comprising determining a formation resistivity based on the resistive parameter and at least one focusing mode selected from a group including three or more focusing modes.

19. The method of claim 1,
wherein determining a first set of voltage measurements comprises determining a phase difference, wherein the phase difference is a difference between a phase of a measurement of the first set of induced voltage measurements and a phase of a signal of the first set of excitation signals corresponding with the measurement; and
wherein determining the resistive parameter is based on the phase difference.

20. A processor-readable medium including instructions that, when performed by a processor circuit, cause the processor circuit to
excite excitation electrodes attached to a well tool to produce a first set of excitation signals, wherein the first set of excitation signals comprise a plurality of frequencies;
determining a first set of induced voltage measurements with monitor electrodes attached to the well tool wherein the first set of induced voltage measurements are induced by the first set of excitation signals;
determine a set of model parameters based on the first set of induced voltage measurements;
reposition the well tool to a new depth in a borehole;
determine whether a specified measurement condition is met; and
in response to the specified measurement condition being met, determine a resistive parameter based on the set of model parameters and on a second set of induced voltage measurements, wherein the second set of induced voltage measurements are induced by a reduced set of excitation signals, and wherein the reduced set of excitation signals comprises a number of frequencies fewer than the plurality of frequencies.

21. An apparatus, comprising:
a well tool body;
an array of electrodes attached to the well tool body, wherein the array of electrodes comprises excitation electrodes and monitor electrodes; and
a processor circuit coupled to the excitation electrodes using an excitation circuit, and coupled to the monitor electrodes using a measurement circuit, the processor circuit programmed to:
excite the excitation electrodes to produce a first set of excitation signals, wherein the first set of excitation signals comprise a plurality of frequencies;

determine a first set of induced voltage measurements with the monitor electrodes, wherein the first set of induced voltage measurements are induced by the first set of excitation signals;

determine a set of model parameters based on the first set of induced voltage measurements;

reposition the well tool body to a new depth in a borehole;

determine whether a specified measurement condition is met; and in response to the specified measurement condition being met, determine a resistive parameter based on the set of model parameters and on a second set of induced voltage measurements, wherein the second set of induced voltage measurements are induced by a reduced set of excitation signals, and wherein the reduced set of excitation signals comprises a number of frequencies fewer than the plurality of frequencies.

22. The method of claim 1, wherein the specified measurement condition is based on a standoff distance between an electrode and the borehole or a casing, wherein the electrode is one of the excitation electrodes or the monitor electrodes.

23. The method of claim 1, wherein the specified measurement condition is based on a temperature.

* * * * *